(12) United States Patent
Catanese et al.

(10) Patent No.: US 8,146,409 B2
(45) Date of Patent: Apr. 3, 2012

(54) COMBUSTION PRESSURE MONITORING SYSTEM FOR A COMBUSTION ENGINE

(75) Inventors: Alessandro Catanese, Orbassano (IT); Filippo Parisi, Turin (IT); Eugenio Pisoni, Turin (IT); Claudio Monferrato, Rondissone (IT)

(73) Assignee: GM Global Technology Operations LLC, Detroit, MI (US)

( * ) Notice: Subject to any disclaimer, the term of this patent is extended or adjusted under 35 U.S.C. 154(b) by 643 days.

(21) Appl. No.: 12/177,782

(22) Filed: Jul. 22, 2008

(65) Prior Publication Data

US 2009/0038385 A1 Feb. 12, 2009

(30) Foreign Application Priority Data

Aug. 6, 2007 (IT) ............... TO2007A0589

(51) Int. Cl.
*G01M 15/08* (2006.01)
(52) U.S. Cl. .................................. 73/114.16
(58) Field of Classification Search ............ 73/114.16, 73/114.17, 114.22, 114.18
See application file for complete search history.

(56) References Cited

U.S. PATENT DOCUMENTS

| | | | | |
|---|---|---|---|---|
| 4,679,536 A * | 7/1987 | Morita | .......... | 123/406.22 |
| 4,693,221 A * | 9/1987 | Nakajima et al. | .......... | 123/406.16 |
| 4,716,759 A * | 1/1988 | Tanaka | .......... | 73/114.16 |
| 4,744,243 A * | 5/1988 | Tanaka | .......... | 73/114.28 |
| 4,802,454 A * | 2/1989 | Tanaka | .......... | 123/406.16 |
| 4,819,171 A * | 4/1989 | Morita | .......... | 701/111 |
| 4,821,194 A * | 4/1989 | Kawamura | .......... | 701/111 |
| 4,892,074 A * | 1/1990 | Iriyama | .......... | 123/406.22 |
| 5,076,098 A | 12/1991 | Miwa | | |
| 5,116,259 A * | 5/1992 | Demizu et al. | .......... | 73/114.06 |
| 5,229,945 A * | 7/1993 | Demizu et al. | .......... | 701/102 |
| 5,276,625 A * | 1/1994 | Nakaniwa | .......... | 701/111 |
| 5,623,412 A | 4/1997 | Masson et al. | | |
| 6,276,319 B2 * | 8/2001 | Walter et al. | .......... | 123/90.15 |
| 7,079,936 B2 * | 7/2006 | Honda | .......... | 701/102 |
| 2001/0002587 A1 * | 6/2001 | Walter et al. | .......... | 123/90.15 |
| 2005/0166665 A1 * | 8/2005 | Honda | .......... | 73/35.12 |

* cited by examiner

*Primary Examiner* — Eric S McCall
(74) *Attorney, Agent, or Firm* — Ingrassia Fisher & Lorenz, P.C.

(57) ABSTRACT

A pressure monitoring system for a combustion engine includes, but is not limited to of combustion chambers and pressure sensors associated to at least some of the combustion chambers. A multiplexer has inputs connected to at least a first one and a second one of the pressure sensors. A non-zero phase shift exists between the operating cycles of first and second ones of the combustion chambers associated to the first and second pressure sensors. A controller controls the multiplexer to output data from the first pressure sensor while the first combustion chamber is in a predetermined portion of its operating cycle and pressure data from the second pressure sensor while the second combustion chamber is in the predetermined portion of its operating cycle.

18 Claims, 1 Drawing Sheet

COMBUSTION PRESSURE MONITORING SYSTEM FOR A COMBUSTION ENGINE

CROSS-REFERENCE TO RELATED APPLICATION

This application claims priority to Italian Patent Application No. 2007000589, filed Aug. 6, 2007, which is incorporated herein by reference in its entirety.

TECHNICAL FIELD

The present invention relates to a pressure monitoring system for monitoring pressure in the combustion chambers of a combustion engine.

Continuously monitoring the pressure in the combustion chambers of an engine, such as a motor vehicle, has proved useful for a precise control of combustion conditions enabling efficient and economic use of fuel, diagnosis of defects, and other purposes.

In a four-stroke engine, a combustion phase is only a short portion of the overall operating cycle, but during this portion, since the pressure varies quickly, pressure samples must be obtained at a high rate and must be associated to precisely determined crankshaft angles. In order to provide precise data at a high engine speed, the pressure sensors must allow for a high sampling rate, and for processing the high data rates provided by these sensors, powerful analog-digital converter circuitry and a considerable amount of buffer storage is needed. Further, it was observed that the high-speed, high-pressure sensors used in conventional pressure monitoring systems have a rather low signal-noise ratio at the close to atmospheric pressures, which prevail in the combustion chambers during a major portion of their operating cycle.

In view of the foregoing, at least one object is to provide a pressure monitoring system capable of acquiring high quality pressure data using simple and economic circuitry. In addition, another object is to provide a pressure monitoring system which is capable of providing low noise pressure data both at high and low pressure levels. Furthermore, other objects, desirable features, and characteristics will become apparent from the subsequent summary and detailed description, and the appended claims, taken in conjunction with the accompanying drawings and this background.

SUMMARY

The foregoing objects and other desirable features and characteristics are achieved by a pressure monitoring system for a combustion engine including, but not limited to combustion chambers and a pressure sensor associated to each combustion chamber. A multiplexer is also provided that has inputs connected to at least a first one and a second one of the pressure sensors and a non-zero phase shift existing between the operating cycles of first and second ones of the combustion chambers associated to the first and second pressure sensors, and a controller for controlling the multiplexer to output data from the first pressure sensor while the first combustion chamber is in a predetermined portion of its operating cycle and pressure data from the second pressure sensor while the second combustion chamber is in the predetermined portion of its operating cycle.

If the predetermined portion of the operating cycle is set so as to include the most significant portion of the operating cycle, namely the combustion phase, the amount of data which has to be converted and processed in the monitoring system is reduced considerably, so that simple and economic data acquisition circuitry may be used.

In case of a combustion engine where the fuel is injected directly into the combustion chambers, in particular in case of a Diesel engine, the predetermined portion of the operating cycle may include the instant of injecting the fuel.

Phases in which intake or exhaust valves of a combustion chamber are open will not be included in the predetermined portion, since in these phases the pressure can safely be assumed to be deterministically related to the pressure in an intake manifold or an exhaust system of the engine and to be close to atmospheric pressure.

A precise, automatic synchronization of the pressure monitoring system and the operation of the combustion engine is achieved by adapting the controller to determine a pressure maximum among data output by one of the pressure sensors and to carry out an adjustment of the beginning and/or the end of the predetermined portion of the operating cycle so that the pressure maximum is detected at a predetermined location of the predetermined portion.

In order to for the thus determined pressure maximum to be strictly simultaneous to the top dead centre position of a piston in the combustion chamber monitored by the pressure sensor, the controller is preferably adapted to carry out the adjustment based only on data obtained in a combustion-free operating cycle.

Preferably, an analog-to-digital converter is connected to an output of the multiplexer. In this way, one such converter can be used to convert pressure data from sensors according to a time division multiplex scheme.

A buffer memory for temporarily storing sequences of pressure data from the combustion chambers is preferably connected to an output of the multiplexer.

It is further preferred that each pressure sensor is triggered to sample the pressure in its associated combustion chamber at predetermined crankshaft angles. In that case, a buffer memory should be adapted to store each pressure sample in association to its respective crankshaft angle.

The foregoing objects and other desirable features and characteristics are further achieved by a pressure monitoring system for a combustion engine including, but not limited to combustion chambers and a pressure sensor associated to each combustion chamber, preferably as defined above, which includes, but is not limited to a calculating means for calculating the pressure in any of the combustion chambers while the combustion chamber is between the predetermined portions of two operating cycles. As pointed out above, the signal-noise ratio of a pressure signal from the sensors tends to be rather poor if the pressure is low, so that it is possible to replace this pressure signal by calculated data without thereby necessarily reducing the quality of the pressure data.

Calculation of pressure and data in an interval between the two predetermined portions is preferably based on at least one pressure sample taken during the preceding predetermined portion and/or at least one pressure sample taken during the subsequent predetermined portion.

Calculation of the pressure in a combustion chamber outside the predetermined portion of the operating cycle is preferably based on the assumption that $pV^\kappa$ is a constant, wherein p is the pressure in the combustion chamber, V is the volume thereof and $\kappa$ is an adiabatic coefficient (e.g., of air, of air/fuel mixture or of exhaust gas).

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
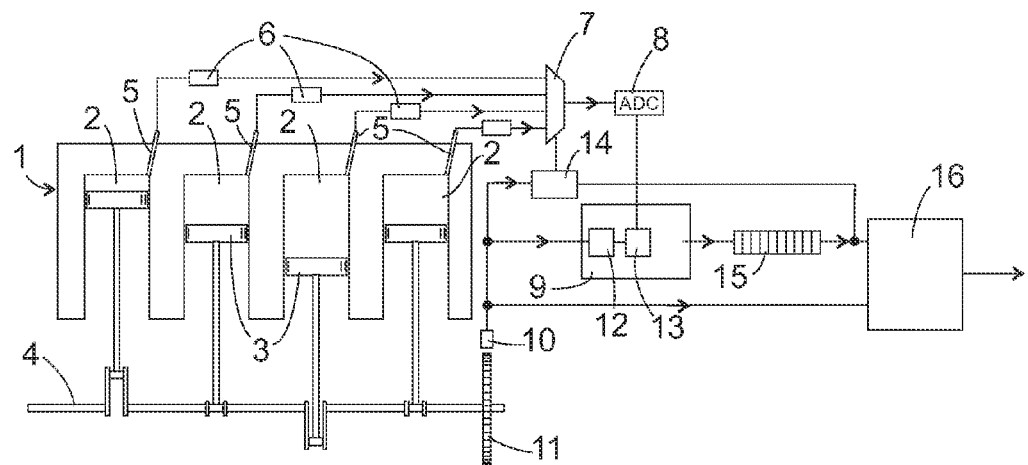
FIG. 1 is a block diagram of a pressure monitoring system according to a first embodiment.

The block diagram of FIG. 1 schematically depicts a four stroke combustion engine 1 having four combustion chambers 2 in which pistons 3 reciprocate so as to drive a crankshaft 4. An operating cycle of each combustion chamber 2 corresponds to two rotations of the crankshaft 4. The operating cycles of the combustion chambers 2 are phase-shifted with respect to each other by a quarter of a cycle, corresponding to a 180° degree rotation of crankshaft 4.

A pressure sensor 5 is provided in each combustion chamber 2. Analog pressure signals from the pressure sensors 5 are applied to inputs of an analog multiplexer 7 via anti-aliasing filters 6. The multiplexer 7 selects a pressure signal from one of the sensors 5 and forwards it to an analog-to-digital converter (ADC) 8. The ADC 8 is triggered to take samples from the pressure signal by an interface circuit 9, which also receives the pressure samples digitized by ADC 8.

A crankshaft angle sensor 10 detects the orientation of crankshaft 4 by sensing teeth of a toothed wheel 11 mounted on crankshaft 4. The toothed wheel 11 may have 60 teeth, for example, so that the crankshaft angle sensor 10 emits detection pulses at a rate of 60 per revolution of the crankshaft 4. The sampling rate of the ADC 8 is higher than the pulse rate of the angle sensor 10 by a factor of 8, for example. For triggering the ADC 8 to acquire a pressure sample, the interface circuit 9 comprises a tunable oscillator, such as a phase-locked loop 12, which is coupled to the angle sensor 10 so as to oscillate at n times the pulse rate of the angle sensor 10, n being an integer (e.g., 8), and a control logic 13 for compensating fluctuations of the crankshaft speed.

A counter 14 counts pulses from angle sensor 10 and, based on this count, controls multiplexer 7 to switch over the pressure sensor 5 connected to ADC 8 twice per revolution of the crankshaft 4. In this way, each of the four pressure sensors 5 is periodically connected to the ADC for a time period corresponding to a 180° degree rotation of the crankshaft 4. The period in which each pressure sensor 5 is connected to the ADC 8 comprises a rising period of its piston 3, in which air which has previously being sucked into the combustion chamber 2 is compressed, ignition of the air-fuel mixture in the combustion chamber 2 and the subsequent expanding stroke of the piston 3. So the sensor 5 from which the samples output from ADC 8 to buffer 15 originate changes four times per crankshaft revolution, the sampled data of each combustion chamber 2 being representative of that quarter of its operating cycle in which the combustion takes place.

The counter 14 has a control input connected to the output side of buffer 15. If no combustion is taking place in the cylinders, the counter detects a maximum in the pressure data output from buffer 15 and the crankshaft angle associated to this maximum. While there is no combustion, this pressure maximum will correspond to the top dead centre position of the piston 3 associated to sensor 5. If necessary, the counter adapts the timing of the switchover between two sensors 5 such that the pressure maximum from a given sensor 5 is always detected at a predetermined location of the crankshaft angle interval in which the pressure signal from this sensor 5 is sampled by ADC 8. This crankshaft angle interval may have a range of about 70° before to about 120°, as an example, after top dead centre position of the piston 3.

A processor 16 connected to the output side of buffer 15 calculates the pressure in the combustion chambers 2 during the unsampled portions of their respective operating cycles based on the pressure samples taken from each of the combustion chambers 2. Such a calculation can be based on the assumption that at least at the end of the sampling period of each combustion chamber 2, there is no more combustion taking place, and the development of the pressure corresponds to adiabatic expansion. Based on the adiabatic expansion formula $pV\gamma=c$, the constant c corresponding to the exhaust gas in the combustion chamber 2 can be calculated based on the last samples of the sampling period, and for the time which follows, c being known and V being a known function of the crankshaft angle, p can be calculated. In the same way, based on the first sampling data obtained during a sampling period, prior to ignition, the pressure before the beginning of the sampling period can be calculated. In this way, the processor 16 provides pressure curves for each combustion chamber and for the entire operating cycle thereof.

Figure 2:
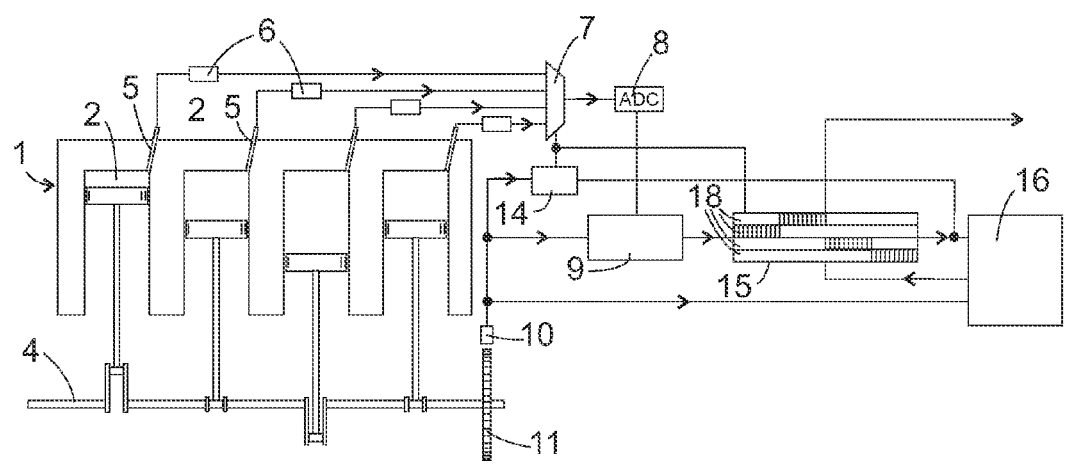
FIG. 2 is a block diagram of a pressure monitoring system according to a second embodiment.

The embodiment shown in FIG. 2 differs from the one of FIG. 1 essentially in the structure of the buffer memory 15. While the buffer 15 in FIG. 1 had a FIFO structure, the embodiment of FIG. 2 comprises a dual gate RAM divided into four portions, each of which is associated to one of the combustion chambers 2. Data from the ADC 8 are input into buffer 15 at an address, the most significant bits of which are generated by the counter 14, and the less significant bits of which are representative of the crankshaft angle. In this way, the sampled data from the ADC 8 corresponding to one of the pressure sensors 5 are stored in a portion 18 of the buffer 15 associated to said sensor 5. The processor 16 accedes some the stored samples, as described above, for calculating the pressure before and after each sampling period and writes this data back into the remainder of each portion 18 of buffer 15. In this way, an external host, not shown, can accede to pressure data for each combustion chamber 2 and any crankshaft angle at any time in buffer 15.

Although the above embodiments referred only to engines having four combustion chambers, it is readily apparent that the invention is applicable to any engine having at least two combustion chambers. If the number of combustion chambers in the engine is six or more, it may be preferable to divide the combustion chambers of the engine into two or more groups (the number of groups being less than the number of combustion chambers) and to associate one multiplexer and one ADC to each group.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pressure monitoring system for a combustion engine, comprising:
    a first combustion chamber;

a second combustion chamber;
a first pressure sensor associated with the first combustion chamber
a second pressure sensor associated with the second combustion chamber;
a multiplexer connected to the first pressure sensor and the second pressure sensor; and
a controller configured to control the multiplexer to produce first pressure data from the first pressure sensor while the first combustion chamber is in a predetermined portion of an operating cycle comprising an instant of injecting fuel into at least one of the first combustion chamber and the second combustion chamber and second pressure data from the second pressure sensor while the second combustion chamber is in said predetermined portion of the operating cycle of the second combustion chamber, wherein the operating cycle of the first combustion chamber is identical to the operating cycle of the second combustion chamber but for a non-zero phase shift therebetween.

2. The pressure monitoring system of claim 1, wherein the predetermined portion of the operating cycle comprises an instant of igniting an air/fuel mixture in at least one of the first combustion chamber and the second combustion chamber.

3. The pressure monitoring system of claim 1, wherein the first combustion chamber and the second combustion chamber have intake valves and exhaust valves and the predetermined portion of the operating cycle of the first combustion chamber and the second combustion chamber excludes opening times of said intake values and said exhaust valves.

4. The pressure monitoring system of claim 1, wherein an analog-to-digital converter is connected to an output of said multiplexer.

5. The pressure monitoring system of claim 1, wherein the first pressure sensor is configured to sample the pressure in the first combustion chamber at a plurality of predetermined crankshaft angles.

6. The pressure monitoring system of claim 1, wherein the controller is configured to determine a pressure maximum from said first pressure data and said second pressure data and to carry out an adjustment of said predetermined portion of the operating cycle so that the pressure maximum is detected at a predetermined location of said predetermined portion.

7. The pressure monitoring system of claim 6, wherein the controller is configured to carry out said adjustment based only on pressure data obtained in a combustion-free operating cycle.

8. The pressure monitoring system of claim 1, wherein a buffer memory is connected to an output of said multiplexer.

9. The pressure monitoring system of claim 8, wherein a buffer memory is configured to store a pressure sample in association to each of the plurality of predetermined crankshaft angles.

10. A pressure monitoring system for a combustion engine, comprising:
a first combustion chamber;
a second combustion chamber;
a first pressure sensor associated with the first combustion chamber
a second pressure sensor associated with the second combustion chamber;
a multiplexer connected to the first pressure sensor and the second pressure sensor; and
a controller configured to control the multiplexer to produce first pressure data from the first pressure sensor while the first combustion chamber is in a predetermined portion of an operating cycle and second pressure data from the second pressure sensor while the second combustion chamber is in said predetermined portion of the operating cycle of the second combustion chamber, wherein the operating cycle of the first combustion chamber is identical to the operating cycle of the second combustion chamber but for a non-zero phase shift therebetween,
wherein the controller is further configured to determine a pressure maximum from said first pressure data and said second pressure data and to carry out an adjustment of said predetermined portion of the operating cycle so that the pressure maximum is detected at a predetermined location of said predetermined portion.

11. The pressure monitoring system of claim 10, wherein the controller is configured to carry out said adjustment based only on pressure data obtained in a combustion-free operating cycle.

12. The pressure monitoring system of claim 10, wherein the predetermined portion of the operating cycle comprises an instant of injecting fuel into at least one of the first combustion chamber and the second combustion chamber.

13. The pressure monitoring system of claim 10, wherein the first combustion chamber and the second combustion chamber have intake valves and exhaust valves and the predetermined portion of the operating cycle of the first combustion chamber and the second combustion chamber excludes opening times of said intake values and said exhaust valves.

14. The pressure monitoring system of claim 10, wherein the predetermined portion of the operating cycle comprises an instant of igniting an air/fuel mixture in at least one of the first combustion chamber and the second combustion chamber.

15. The pressure monitoring system of claim 10, wherein an analog-to-digital converter is connected to an output of said multiplexer.

16. The pressure monitoring system of claim 10, wherein the first pressure sensor is configured to sample the pressure in the first combustion chamber at a plurality of predetermined crankshaft angles.

17. The pressure monitoring system of claim 10, wherein a buffer memory is connected to an output of said multiplexer.

18. The pressure monitoring system of claim 17, wherein a buffer memory is configured to store a pressure sample in association to each of the plurality of predetermined crankshaft angles.

* * * * *